J. Clark,
Pipe Tong.
No. 98,925.    Patented Jan. 18. 1870.
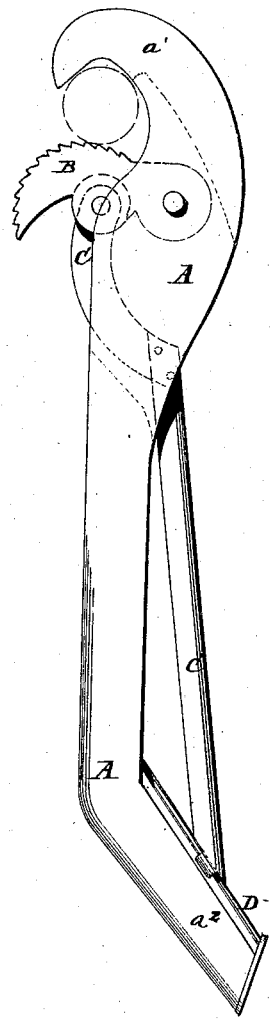
Witnesses:
A. W. Almquist
Edgar Tate
Inventor:
J. Clark
per
Attorneys.

United States Patent Office.

JOHN CLARK, OF ASTORIA, NEW YORK.

Letters Patent No. 98,925, dated January 18, 1870.

IMPROVEMENT IN PIPE-TONGS.

The Schedule referred to in these Letters Patent and making part of the same.

To all whom it may concern:

Be it known that I, JOHN CLARK, of Astoria, in the county of Queens, and State of New York, have invented a new and useful Improvement in Pipe-Tongs; and I do hereby declare that the following is a full, clear, and exact description thereof, which will enable others skilled in the art to make and use the same, reference being had to the accompanying drawing, forming part of this specification, in which the figure is a side view of my improved pipe-tongs.

My invention has for its object to furnish an improved pipe-tongs, simple in construction, and effective in operation, and which will operate with equal efficiency upon various sizes of pipes; and It consists in the construction and combination of the various parts of the tongs, as hereinafter more fully described.

A is the handle of the tongs, upon the forward end of which is formed the hook $a^1$, that receives the pipe to be turned, the concavity of which hook is so formed, as shown in the figure, as to receive different sized pipes, and hold them equally firm.

B is a movable cam-lever jaw, which is pivoted, at one end, in a slot formed in the body of the handle A, at the base of the hook $a^1$, and which has teeth formed upon its curved side, as shown in the figure, to take hold of the pipe to be operated upon.

The cam B may, if desired, be made in the form of a toothed wheel, pivoted, at or near its rim, to the handle A, and at its centre to the lever C; but I prefer the construction first described, as being simpler and equally effective.

C is a lever, the forward part of which is curved or bent, as shown in the figure, to adapt it to passing through the slot in the handle A, and operating the movable jaw B, to which jaw the forward end of the said lever is pivoted, as shown in the drawing.

The outer end of the lever C has an eye formed in or attached to it, which slides along a guide-rod or tongue, D, attached to or formed upon the outer part $a^2$ of the handle A, which said part $a^2$ is inclined rearward, to give a suitable direction to the lever C, when operating the movable jaw B. The lever C is required merely to move the jaw B to and from the pipe to be operated upon, the peculiar arrangement of the hook and jaw being such as to cause them to grasp and hold the pipe firmly when being operated.

Having thus described my invention,

I claim as new, and desire to secure by Letters Patent—

An improved pipe-tongs, formed by the combination of the handle A $a^1$ $a^2$, movable cam-lever jaw B, lever C, and guide D, with each other, said parts being constructed and operating substantially as herein shown and described, and for the purpose set forth.

The above specification of my invention signed by me, this 13th day of December, 1869.

JOHN CLARK.

Witnesses:
JOHN J. HALSEY,
JAMES T. GRAHAM.